Aug. 31, 1926.
H. F. HERBIG
1,597,683
METHOD OF AND APPARATUS FOR ELECTRICAL SIGNALING
Filed Jan. 24, 1925
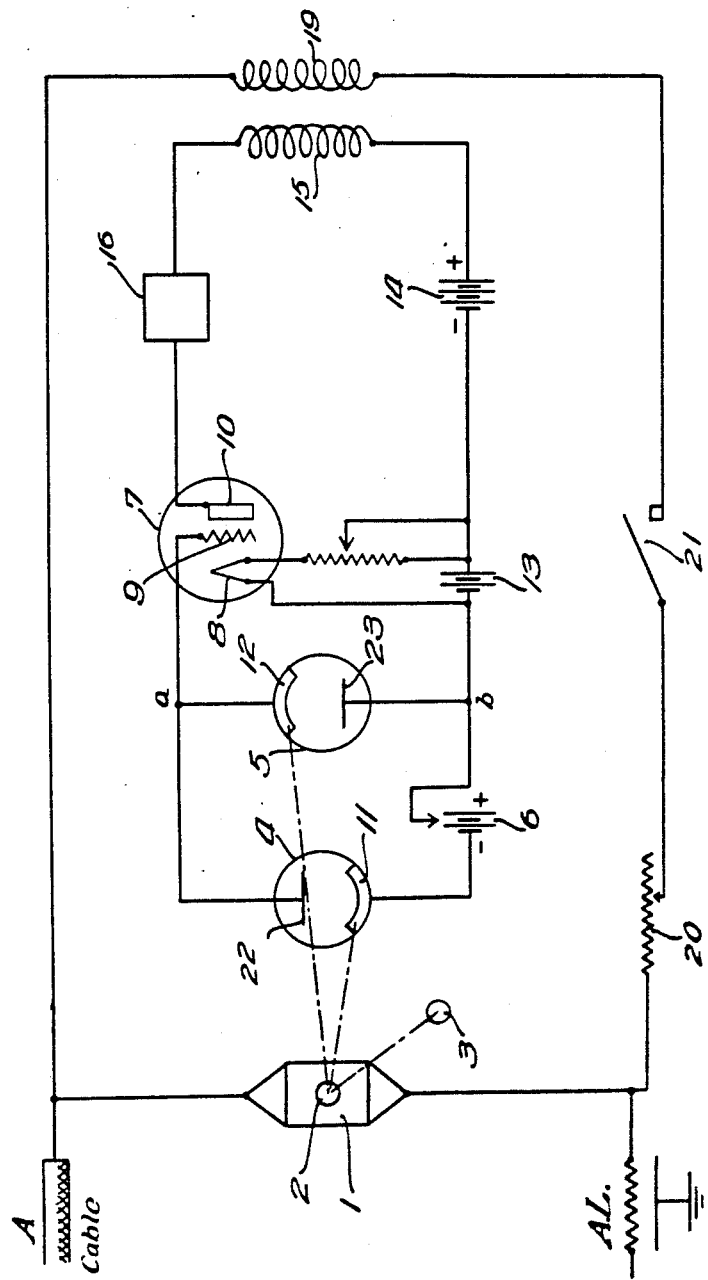
INVENTOR
Henry F. Herbig.
BY
ATTORNEYS Patented Aug. 31, 1926.

1,597,683

UNITED STATES PATENT OFFICE.

HENRY F. HERBIG, OF NEW YORK, N. Y., ASSIGNOR OF ONE-HALF TO THE COMMERCIAL CABLE COMPANY, OF NEW YORK, N. Y., A CORPORATION OF NEW YORK.

METHOD OF AND APPARATUS FOR ELECTRICAL SIGNALING.

Application filed January 24, 1925. Serial No. 4,633.

This invention relates particularly to a method of an apparatus for amplifying and regenerating electrical impulses transmitted as signals. The circuit and apparatus may be especially adapted to the amplifying of electrical impulses transmitted by means of a submarine cable, and also to impulses transmitted by means of conductors used in land line telegraphy.

The electrical impulses transmitted are received by means of a galvanometer, or by means of any other device that is energized to a state of motion by means of the electrical impulse. The galvanometer will be oscillated by reversals of electric current and these oscillations are utilized to produce an electric current having like oscillations and a part of this current is fed back to the galvanometer.

The apparatus consists of photo-electric cells in circuit with one or several vacuum tubes.

The illumination of the photo-electric cells is varied by means of the receiving apparatus in response to the electrical impulse. The effect of the variation of the amount of light on the photo-electric cells cause a variation of the potential in the grid filament circuit. The variation of potential in the grid circuit causes a variation in the plate current.

The plate circuit is coupled to the circuit of the receiving galvanometer, or other device which may be used, by means of a transformer, a condenser, or a resistance, connected so as to be in the proper phase relation with the incoming signal. There is no physical electrical connection from the plate to the grid circuit. The energy fed back from the plate circuit to the receiving circuit may be controlled in many ways, such as varying the coupling of the windings of the transformer, or by varying the resistance coupling, etc. The energy that is fed back to the receiving circuit must be controlled so as to prevent a steady oscillation of the receiving galvanometer, or other device adapted for such purpose. The amplitude of the signal may be controlled by the coupling until the point of oscillation is reached.

The additional energy that is fed back to the receiving system by the means herein described, causes a greater movement of the galvanometer coil than it would otherwise receive. The increased movement of the receiving device causes a greater variation of the amount of light on the photo-electric cells, which in turn increases the potential variation in the grid-filament circuit of the three electrode device. This increased potential variation in the grid circuit, causes a larger variation in the amplitude of the energy in the plate circuit, and hence a much larger amplification of the received signal than would otherwise be obtained. A siphon recorder, relay, or any recording device may be connected in the plate circuit to record or retransmit the signal in the way well known in the art.

Satisfactory results have been obtained by the use of reflections from a mirror attached to a moving galvanometer coil, which is actuated by the electrical signal impulses, and through its deflections, varying the amount of light on the photo-electric cells. Two photo-electric cells are arranged in the circuit shown, but similar results can be obtained with one or more.

The photo-electric cells are so connected with a three electrode device that a variation of the amount of light on the two cells causes a variation of the potential across the grid filament circuit of the three electrode device. By variation of the potential of the grid circuit, variation of the energy in the plate circuit results. Part of the energy of the plate circuit is fed back to the receiving circuit in proper phase relation, and causes an additional movement of the galvanometer coil. This additional movement of the coil causes a greater variation of the potential of the grid-filament circuit by the increased variation of the amount of light on the two photo-electric cells. The increased potential of the grid filament circuit of the three electrode device causes a greater variation of the energy of the plate circuit, which results in a much larger amplitude of signal than would otherwise be obtained without the feed back system.

In the drawing:

Fig. 1 is a diagrammatic view of one form of circuit.

In the drawing A designates the receiving end of a submarine cable AL designates the usual artificial line. 1 designates a coil of a suspended coil galvanometer which is connected in the usual manner to the cable and to the artificial line. Incoming signal impulses move the galvanomter coil in the usual manner. On the coil 1 is mounted a reflecting mirror 2 and said mirror receives light rays from a lamp 3.

The light rays from the lamp 3 are reflected from the mirror 2 to the two photo-electric cells. The photo-electric cell used in carrying out this invention consists of a light-sensitive substance, such as barium, which is the cathode, and a wire, plate or grid as the anode, usually sealed in a highly evacuated bulb with an opening for light to enter the cell. When light enters the cell it causes the light-sensitive substance (the cathode) to emit electrons. When an electromotive force is connected to the terminals of the cell, positive side of said electromotive force to the anode and negative to the cathode, the liberated negative electrons are drawn to the anode of the cell causing a current to flow in the electrical circuit. The photo-electric current is proportional to the amount of illumination of the light-sensitive substance of the cell. These cells may be of any suitable form. The well known Case barium cell made in accordance with Patent No. 1,376,605 issued to Theodore W. Case, May 3, 1921, has been found to be satisfactory.

Two photo-electric cells 4 and 5 are connected in series with a source of current 6. A three-electrode vacuum tube is shown at 7, said tube being provided with the usual filament 8, grid 9 and plate 10. The cathode 12 or light-sensitive terminal of the photo-electric cell 5, and the anode 22 of the cell 4, are electrically connected to the grid 9. The anode 23 of the cell 5 is connected to the + side of the battery 6 and the cathode 11 of the cell 4 is connected to the — side of the battery 6. At $a$ and $b$ of the series circuit which includes the photo-electric cells, connections are made to the grid and negative terminals respectively of the three electrode tube 7. The light rays from the lamp 3 are reflected from the mirror 2 to the electron emitting surfaces 11 and 12 of the two cells 4 and 5 respectively. The cells and the reflecting mirror 2 are so arranged that in the normal or zero position of the coil 1 both of said cells will be partly illuminated. The rotation or oscillation of the coil will increase the illumination of one cell and decrease the illumination of the other cell as will be more fully hereinafter described. The three electrode tube is provided with the usual A and B battery supply 13 and 14, the battery 13 being in the filament circuit and the battery 14 being in the plate circuit.

In series with the plate circuit of the three electrode device is connected the primary winding 15 of a transformer, and a relay or recording device 16. The secondary winding 19 of the transformer is connected in series with the receiving galvanometer coil 1 and a high resistance 20 on the artificial line side of the coil. 21 designates a switch arranged in the series circuit of the secondary coil of the transformer.

The galvanometer coil 1 is so arranged that with no incoming signal the two electron emitting surfaces 11 and 12 of the photo-electric cells are partially illuminated, causing a steady potential to exist in the grid-filament circuit. This steady potential in the grid circuit causes a steady plate current to flow through the recording device 16, the effect of which may be neutralized by any suitable means, such as a spring bias, a magnetic bias or an electrical bias.

When an electrical impulse is received, the coil 1 with the attached mirror 2 is deflected either to the left or to the right depending upon the direction of flow of current through the coil. Assuming that a deflection to the left causes the amount of light to increase on the cell 4 and to decrease on the cell 5, the impedance of cell 4 is decreased while that of cell 5 is increased. The current flowing through the series circuit causes a large voltage drop across the grid filament circuit. The grid becomes more negative by this voltage drop. The current flow in the plate circuit of the three electrode device, therefore, decreases. This change of current in the plate circuit which flows through the primary winding of the transformer 15 induces an electromotive force in the secondary winding 19 of the transformer, which causes a current to flow back to and through the coil 1. When the transformer secondary winding 19 is connected so that the signal current and the current caused by the electromotive force induced in the transformer winding 19 are in phase, the coil 1 is deflected to an angle greater than that which would be caused by the original signal. The amount of light on cell 4 is further increased by the increase of angular movement due to the feed-back current, while the amount of light on the cell 5 is decreased by the same amount. Thus a further decrease of potential of the grid filament results. The plate current is, therefore, decreased still further. In this way a large amplitude of signal is obtained in the plate circuit. The variable resistance 20 controls the current flowing through coil 1 as a result of the induced electro-motive force in winding 19 of the transformer.

Two photo-electric cells are shown and described herein, but it is to be understood that the electron discharge device sensitive to light may consist of a single photo-electric cell and a suitable resistance or impedance across the grid circuit, or the said electron discharge device may consist of more than two photo-electric cells properly arranged in circuit.

The matter shown in the drawings and described herein but not claimed is claimed in my co-pending application, Serial No. 713,832 filed May 16, 1924.

What I claim is:

1. The method of receiving and amplifying electric impulses, consisting in producing a constant normal flow of electrons in a light sensitive electron discharge device by partially illuminating said device, causing a variation in said electron flow by varying the illumination of the said discharge device by means of the received impulses, utilizing the variations in the said electron flow to control means to reproduce and amplify impulses corresponding to the impulses received, and then utilizing the amplified impulses to strengthen the received impulses and thereby increase the variations in the illumination of the light sensitive electron discharge device.

2. The method of receiving and amplifying electric impulses by means of an electron discharge device sensitive to light, consisting in producing a variable electron discharge in said device by variably illuminating it in response to the received signals, utilizing the variations in the said electron flow to control means to reproduce and amplify impulses corresponding to the received impulses, and then utilizing a part of the energy of the amplified impulses to increase the variations in the illumination of the light sensitive electron discharge device.

3. The method of receiving and amplifying electric impulses by means of an electron discharge device sensitive to light, consisting in producing a constant normal flow of electrons in the said discharge device by partially illuminating said device, increasing and decreasing the said electron flow by increasing and decreasing the illumination of the said discharge device in response to the received electric impulses, utilizing the variations in the said electron flow to control means to reproduce and amplify impulses corresponding to the impulses received, and then feeding back a part of the energy of the amplified impulses to strengthen the received impulses and thereby increase the variations in the illumination of the light sensitive electron discharge device.

4. The method of receiving and amplifying electric impulses by means of an electron discharge device sensitive to light, consisting in producing a constant normal flow of electrons in the said discharge device by partially illuminating said device, increasing and decreasing the said electron flow by increasing and decreasing the illumination of the said discharge device in response to the received electric impulses, utilizing the variations in the said electron flow to control means to amplify impulses corresponding to the impulses received, and then feeding back a part of the energy of the amplified impulses to increase the variations in the illumination of the light sensitive electron discharge device.

5. An apparatus for receiving and amplifying electric impulses, comprising an electron discharge cell responsive to light, means operated by the received impulses to vary the illumination of the light sensitive terminal of said cell, an electron discharge device having grid and plate circuits, means whereby the variation in the electron discharge in the said cell will vary the potential of the grid circuit and thereby vary the plate current, and means for feeding back a part of the energy of the plate circuit to strengthen the received signals and thereby increase the variations in the illumination of the said light sensitive cell.

6. An apparatus for receiving and amplifying electric impulses, comprising an electron discharge device having one terminal of a light sensitive substance which when illuminated discharges electrons to another terminal in said discharge device, means operated by the received signals for variably illuminating the said light sensitive substance, a second electron discharge device having a grid circuit and a plate circuit, means whereby the variations in the flow of electrons in the first electron discharge device will vary the plate current in the second electron discharge device, an impulse reproducing means operated by the variations in the said plate current, and means for feeding back a part of the energy of the plate circuit to strengthen the received signals and thereby increase the variations in the illumination of the light sensitive cell.

7. An apparatus for receiving and amplifying electric impulses, comprising an electron discharge device having one terminal of a light sensitive substance which when illuminated discharges electrons to another terminal in said discharge device, means operated by the received signals for variably illuminating the said light sensitive substance, a second electron discharge device having a grid circuit and a plate circuit, means whereby the variations in the flow of electrons in the first electron discharge device will vary the plate current in the second electron discharge device, a signal indicating means operated by the variations in the said plate current, and means for utilizing a part of the energy of the amplified impulses to increase the variations in the illumination of the light sensitive electron discharge device.

8. An apparatus for receiving and amplifying electric signal impulses, comprising an electron discharge cell responsive to light, means operated by the received signals to variably illuminate said cell, an electric circuit including said cell and arranged to provide a substantially constant current flow through the said cell, said current flow being varied by the variable electron discharge due to the variable illumination of the said cell, means responsive to the variations in said current flow to reproduce and amplify the received signals, and means for feeding back a part of the energy of the amplified signals to strengthen the received signals and thereby increase the variations in the illumination of the said light sensitive cell.

9. An apparatus for receiving and amplifying electric impulses, comprising an electron discharge device having two terminals one of which is a light sensitive substance which when illuminated discharges electrons to the other of said terminals, a signal receiving means having a normal zero position and adapted to be moved in one direction by positive current impulses and in the opposite direction by negative current impulses, means whereby in its zero position the signal receiving means will partly illuminate the said light sensitive substance of the electron discharge device, the movements of said signal receiving means in response to the positive and negative impulses increasing and decreasing the said illumination to increase and decrease the flow of electrons, an impulse reproducing and amplifying means, means for causing a substantially uniform flow of current through said amplifying means, said current flow holding the reproducing means at zero position, means responsive to the variations in the electron discharge to vary the flow of current through the amplifying means to thereby reproduce and amplify the impulses which caused the variations in illumination of the light sensitive substance, and means for feeding back a part of the energy of the amplified impulses to strengthen the received impulses and thereby increase the variations in the illumination of the light sensitive electron discharge device.

10. An apparatus for receiving and amplifying electric impulses, comprising an electron discharge device having two terminals one of which is a light sensitive substance which when illuminated discharges electrons to the other of the said terminals, a signal receiving means having a normal zero position and adapted to be moved by current impulses, means whereby in its zero position it will partly illuminate the said light sensitive substance of the electron discharge device, the movements of said signal receiving means in response to the current impulses increasing and decreasing the said illumination to increase and decrease the flow of electrons, an impulse reproducing and amplifying means, means for causing a substantially uniform flow of current through said amplifying means, said reproducing means being held at zero position under said current flow, means responsive to the variations in the electron discharge to vary the flow of current through the amplifying means to thereby reproduce and amplify the impulses which caused the variations in illumination of the light sensitive substance, and means for feeding back a part of the energy of the amplified impulses to strengthen the received impulses and thereby increase the variations in the illumination of the light sensitive electron discharge device.

11. An apparatus for receiving and amplifying electric impulses, comprising an electron discharge device having two terminals one of which is a light sensitive substance which when illuminated discharges electrons to the other of the said terminals, a signal receiving means having a normal zero position and adapted to be moved in one direction by positive current impulses and in the opposite direction by negative current impulses, means whereby in its zero position it will partly illuminate the said light sensitive substance of the electron discharge device, the movements of said signal receiving means in response to the positive and negative impulses increasing and decreasing the said illumination to increase and decrease the flow of electrons, a second electron discharge device having a plate circuit and a grid circuit, means for causing a substantially uniform flow of current through the plate circuit, means whereby the variations in the electron flow in the light sensitive cell will vary the potential of the grid and thereby vary the flow of current in the plate circuit, an impulse reproducing means in the plate circuit, said impulse reproducing means being at zero position under the influence of the substantially uniform current of the said plate circuit and movable from said zero position by variations of the current in the plate circuit, and means for feeding back a part of the energy of the plate circuit to strengthen the received signals and thereby increase the variations in the illumination of the said light sensitive cell.

12. An apparatus for receiving and amplifying electric impulses, comprising an electron discharge cell responsive to light, means operated by the received impulses to vary the illumination of the light sensitive terminal of said cell, an electron discharge device having grid and plate circuits, means whereby the variation in the electron discharge in the said cell will vary the potential of the grid circuit and thereby vary the plate current, means for feeding back a part of the energy of the plate circuit to strengthen the received signals and thereby increase the variations in the illumination of the said light sensitive cell, and means for controlling the amount of current fed back to the impulse receiving means.

13. An apparatus for receiving and amplifying and reproducing electric impulses, comprising a receiving galvanometer coil to receive the incoming signal impulses, two photo-electric cells connected in series with a source of electric current, a three-electrode vacuum tube having a grid circuit and a plate circuit, the grid being electrically connected to one terminal of one of said cells the other terminal of said cell being connected to the current source and to the other side of the grid circuit, means for producing a substantially constant flow through the two cells, means operated by the movement of the galvanometer coil in response to the incoming signal impulses for varying the current flow through the said cells to thereby vary the potential of the grid circuit, a signal reproducing means operated by the plate circuit, and means for feeding a part of the energy of the plate circuit back to the circuit of the receiving galvanometer coil.

14. An apparatus for receiving, amplifying and reproducing electric impulses, comprising an impulse receiving means, two electron discharge cells sensitive to light connected in series with a source of electric current, an impulse amplifying vacuum tube having a grid circuit and a plate circuit the grid being connected to one terminal of one of said cells the other terminal of said cell being connected to the positive side of the current source and to the other side of the grid circuit, means for illuminating both of said cells to produce a substantially constant flow through the two cells, means operated by the impulse receiving means for varying the illumination of both of said cells to thereby vary the current flow through said cells to produce changes in the potential of the grid circuit, an impulse reproducing means in the plate circuit of the vacuum tube, and means for feeding back to the impulse receiving means a part of the energy of the amplified impulses.

15. An apparatus for receiving and amplifying electric current impulses comprising a normally closed electric circuit including two electron discharge cells responsive to light connected in series in said circuit, means to illuminate said cells for producing a substantially constant current flow through said cells, means responsive to the received signals for increasing the illumination of one of said cells and decreasing the illumination of the other cell to thereby vary the current flow through the said two cells and produce changes in the potential of one terminal of one of said cells, an impulse amplifying and reproducing means responsive to the said variations of potential, and means for feeding back to the impulse receiving means a part of the energy of the amplified impulses.

16. An apparatus for receiving, amplifying and reproducing electric impulses, comprising an impulse receiving means, two electron discharge cells sensitive to light connected in series with a source of electric current, an impulse amplifying vacuum tube having a grid circuit and a plate circuit the grid being connected to one terminal of one of said cells the other terminal of said cell being connected to the positive side of the current source and to the other side of the grid circuit, means for producing a substantially constant flow through the two cells, means operated by the impulse receiving means for varying the current flow through the said cells to thereby vary the potential of the grid circuit, an impulse reproducing means in the plate circuit of the vacuum tube, and means for feeding back to the impulse receiving means a part of the energy of the amplified impulses.

17. An apparatus for receiving and amplifying electric impulses, comprising an electron discharge cell responsive to light, means operated by the received impulses to vary the illumination of the light sensitive terminal of said cell, an electron discharge device having grid and plate circuits, means whereby the variation in the electron discharge in the said cell will vary the potential of the grid circuit and thereby vary the plate current, and means for feeding back a part of the energy of the plate circuit to increase the variations of potential of the grid circuit.

18. An apparatus for receiving, amplifying and reproducing electric impulses, comprising an impulse receiving means, two electron discharge cells sensitive to light connected in series with a source of electric current, an impulse amplifying vacuum tube having a grid circuit and a plate circuit, the grid being connected to one terminal of one of said cells the other terminal of said cell being connected to the + side of the current source and to the other side of the grid circuit, means for illuminating both of said cells to produce a substantially constant flow through the two cells, means operated by the impulse receiving means for varying the illumination of both of said cells to thereby vary the current flow through the said cells to produce changes in the potential of the grid circuit, an impulse reproducing means in the plate circuit of the vacuum tube, and means for feeding back a part of the energy of the plate circuit to increase the variations of potential of the grid circuit.

19. An apparatus for receiving and amplifying electric impulses, comprising an electron discharge device having one terminal of a light sensitive substance which when illuminated discharges electrons to another terminal in said discharge device, means operated by the received signals for variably illuminating the said light sensitive substance, a second electron discharge device having a grid circuit and a plate circuit, means whereby the variations in the flow of electrons in the first electron discharge device will vary the plate current in the second electron discharge device, an impulse reproducing means controlled by the variations in the said plate current, a primary transformer coil in series in the plate circuit, and a secondary transformer coil connected in series with the impulse receiving means whereby a part of the energy of the plate current will be fed back to the impulse receiving means through the secondary coil of the transformer.

20. A method of increasing the oscillations of a device adapted to be oscillated by reversals of electric current, consisting in producing a constant normal flow of electrons in a light-sensitive electron discharge device by partially illuminating said device, causing a variation in said electron flow by varying the illumination of said discharge device by the movements of the oscillating device, utilizing the variations in said electron flow to control means to produce amplified oscillating current impulses, and feeding a part of said amplified current impulses back to the oscillating device.

21. A method of amplifying the oscillations of a device adapted to be oscillated by reversals of electric current, consisting in utilizing the oscillations to variably illuminate a light-sensitive electron discharge device, utilizing the variations of illumination to produce an amplified oscillating current, and then feeding back a part of said amplified oscillating current to the oscillating device.

22. An apparatus for amplifying electric impulses, comprising an oscillatory device adapted to be operated by reversals of current, a photo-electric cell, means whereby the movements of the oscillating device will variably illuminate the photo-electric cell, and means whereby the variations in the illumination of the photo-electric cell will produce an oscillating current and feed a part of said current back to the oscillating device.

23. An apparatus for amplifying electric impulses, comprising an oscillatory device adapted to be operated by reversals of current, a light-sensitive cell, means whereby the movements of the oscillating device will variably illuminate the light-sensitive cell, and means whereby the variations in the illumination of the light-sensitive cell will produce an oscillating current and feed a part of said current back to the oscillating device.

24. An apparatus for amplifying electric impulses, comprising an oscillatory device adapted to be operated by reversals of current, a light-sensitive cell, means whereby the movements of the oscillating device will variably illuminate the light-sensitive cell, and means whereby the variations in the illumination of the light-sensitive cell will produce and amplify an oscillating current and feed a part of said current back to the oscillating device.

In testimony whereof I hereunto affix my signature.

HENRY F. HERBIG.